US012692925B2

(12) United States Patent
Nichols et al.

(10) Patent No.: US 12,692,925 B2
(45) Date of Patent: Jul. 28, 2026

(54) DAMPING UNIT AS A SECONDARY LOAD PATH FOR A MOVABLE ELEMENT WITH ACTUATOR

(71) Applicant: Wisk Aero LLC, Mountain View, CA (US)

(72) Inventors: Chase Nichols, Kirkland, WA (US); Shawn Falzone, Buffalo, NY (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

(21) Appl. No.: 18/671,281

(22) Filed: May 22, 2024

(65) Prior Publication Data

US 2024/0391597 A1 Nov. 28, 2024

Related U.S. Application Data

(60) Provisional application No. 63/468,500, filed on May 23, 2023.

(51) Int. Cl.
*F16F 15/02* (2006.01)

(52) U.S. Cl.
CPC .......... *F16F 15/02* (2013.01); *F16F 2230/24* (2013.01)

(58) Field of Classification Search
CPC .................. F16F 15/02; F16F 2230/24; B64D 1/00–2241/00
USPC ........................................................... 701/3
See application file for complete search history.

(56) References Cited

U.S. PATENT DOCUMENTS 3,288,227 A 11/1966 Hans
5,280,863 A * 1/1994 Schmittle ................ B64C 3/385
244/46

6,260,793 B1 * 7/2001 Balayn ................ B64C 29/0033
244/66
6,607,161 B1 * 8/2003 Krysinski ........... B64C 29/0033
244/7 C
9,022,314 B1 * 5/2015 Van Der Westhuizen ...................
B64C 27/025
244/17.11
10,443,675 B2 * 10/2019 Welsh ..................... B64C 27/10
12,129,905 B2 * 10/2024 Gao ........................ F16F 15/03
2013/0105623 A1 5/2013 Moulon et al.

(Continued)

FOREIGN PATENT DOCUMENTS

EP 3404395 A1 11/2018

OTHER PUBLICATIONS

PCT/US2024/030509 , "International Search Report and Written Opinion", Sep. 4, 2024, 11 pages.

(Continued)

*Primary Examiner* — Mohamed Abdo Algehaim

(74) *Attorney, Agent, or Firm* — Kilpatrick Townsend & Stockton LLP

(57) ABSTRACT

Embodiments provide a damping unit coupled to a moveable element. An actuator configured to drive the moveable element provides a primary load path, while the damping unit provides a secondary load path that slows uncontrolled motion of the moveable element in the event of failure of the primary load path. To test the working condition of the damping unit, a load on the actuator can be measured when the actuator drives the moveable element. If the load is greater than a predetermined threshold, it can be determined that the damping unit is providing a damping force against the actuator, and therefore the damping unit is operational.

19 Claims, 6 Drawing Sheets

(56) References Cited

U.S. PATENT DOCUMENTS

| | | | |
|---|---|---|---|
| 2016/0288903 A1* | 10/2016 | Rothhaar | B64C 9/04 |
| 2016/0304188 A1 | 10/2016 | Moulon et al. | |
| 2017/0210463 A1* | 7/2017 | Koessick | B64C 27/48 |
| 2018/0100790 A1* | 4/2018 | Schleuter | G01N 3/08 |
| 2018/0162550 A1 | 6/2018 | Hale et al. | |
| 2018/0334268 A1 | 11/2018 | Moulon et al. | |
| 2019/0002078 A1* | 1/2019 | Parham, Jr. | B64C 1/12 |
| 2019/0127055 A1* | 5/2019 | Derham | G05D 1/0066 |
| 2022/0266997 A1* | 8/2022 | Bennett | B64C 29/0033 |
| 2022/0376514 A1* | 11/2022 | Culpin | H02H 7/26 |
| 2022/0396355 A1* | 12/2022 | Depape | B64D 27/31 |
| 2023/0121845 A1* | 4/2023 | Hufenbach | B64D 1/22 |
| | | | 701/3 |
| 2023/0184117 A1* | 6/2023 | Zheng | F01D 5/16 |
| | | | 415/190 |
| 2023/0322403 A1* | 10/2023 | Ciciriello | B64D 31/00 |
| | | | 701/3 |
| 2024/0117829 A1* | 4/2024 | Bernard | B64C 11/02 |
| 2025/0066028 A1* | 2/2025 | Beno | B64D 27/31 |

OTHER PUBLICATIONS

Application No. CA3,285,949 , Office Action, Mailed on Nov. 19, 2025, 4 pages.

* cited by examiner

300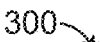

```
┌─────────────────────────────────────────────────────────┐
│        CONTROL AN ACTUATOR TO ACTUATE TO CAUSE MOTION    │
│                  OF A MOVEABLE ELEMENT                    │
│                        STEP 1                            │
└─────────────────────────────────────────────────────────┘
                           │
                           ▼
┌─────────────────────────────────────────────────────────┐
│        DETERMINE LOAD ON THE ACTUATOR DURING MOTION      │
│                        STEP 2                            │
└─────────────────────────────────────────────────────────┘
                           │
                           ▼
┌─────────────────────────────────────────────────────────┐
│      COMPARE LOAD ON THE ACTUATOR TO PREDETERMINED       │
│                    THRESHOLD VALUE                        │
│                        STEP 3                            │
└─────────────────────────────────────────────────────────┘
                           │
                           ▼
┌─────────────────────────────────────────────────────────┐
│      DETERMINE THAT DAMPER IS OPERATIONAL WHEN THE       │
│        LOAD ON THE ACTUATOR EXCEEDS THE                  │
│          PREDETERMINED THRESHOLD VALUE                    │
│                        STEP 4                            │
└─────────────────────────────────────────────────────────┘
                           │
                           ▼
┌─────────────────────────────────────────────────────────┐
│                INITIATE A FLIGHT PROCESS                  │
│                        STEP 5                            │
└─────────────────────────────────────────────────────────┘
```

DAMPING UNIT AS A SECONDARY LOAD PATH FOR A MOVABLE ELEMENT WITH ACTUATOR

CROSS-REFERENCES TO RELATED APPLICATIONS

This application claims benefit under 35 USC§ 119(e) to U.S. Provisional Patent Application No. 63/468,500 filed May 23, 2023, and entitled "METHOD OF DETECTING SECONDARY LOAD PATH PERFORMANCE CAPABIL-ITY," the disclosure of which is incorporated by reference herein in its entirety for all purposes.

BACKGROUND

A primary load path can be damaged, break, disconnect, or otherwise fail, leaving a movable element in an uncon-trolled and unsupported state. To manage failure modes, a secondary load path can be provided for the movable element. However, it is typically difficult to determine whether the secondary load path is in working condition and ready to support the movable element should the primary load path suddenly fail, as secondary load path is typically not being loaded or utilized until the primary load path fails. In the context of aircraft, it may be considered important or required to verify that a secondary load path is in working condition. However, current solutions for detecting the proper operation of a secondary load path involve a costly and time intensive removal and inspection process, or expensive active sensors intended to identify the operation of the secondary load path.

Embodiments address these and other problems, individu-ally or collectively.

SUMMARY

Techniques disclosed herein relate generally to a damping unit providing a backup load path in case of failure of a primary load path. More specifically, techniques disclosed herein can apply to an aircraft including tiltable propulsion systems. An actuator configured to drive a tiltable propul-sion system provides a primary load path, while the damping unit provides a secondary load path that slows uncontrolled motion of the tiltable propulsion system in the event of failure of the actuator.

Embodiments further provide a method for testing the working condition of the damping unit. While the aircraft is at rest, the actuator can tilt the tiltable propulsion system, and a load on the actuator can be determined. For example, an amount of power being used by the tiltable propulsion system can be measured and used to determine the amount of force being used by the actuator to move the tiltable propulsion system. Due to configurations of the damping unit described herein, a functioning damping unit resists the movement of the propulsion system, and therefore increases the load on the actuator. If the load is greater than a predetermined threshold, it can be determined that the damping unit is providing a damping force against the actuator, and therefore the damping unit is operational. Various inventive embodiments are described herein, includ-ing methods, processes, systems, devices, and the like.

Embodiments provide a system comprising a movable element configured to move between a first position and a second position; a fixed element; an actuator configured to actuate between an extended position and a retracted posi-tion; a primary load path between the movable element and the fixed element including the actuator configured to move the movable element between the first position and the second position; and a damping unit configured to passively extend or retract to provide a damping force to the movable element that opposes a motion of the movable element; a secondary load path between the movable element and the fixed element comprising the damping unit configured to move parallel to the primary load path and damp a move-ment of the actuator and the movable element.

According to further embodiments, the system further includes a first coupler providing a first coupling between the actuator and the movable element such that an actuation of the actuator between the extended position and the retracted position causes the motion of the movable element between the first position and the second position; a second coupler providing a second coupling between the actuator and the fixed element; a third coupler providing a third coupling between the damping unit and the movable element such that the motion of the movable element causes the extension or the retraction of the damping unit; and a fourth coupler providing a fourth coupling between the damping unit and the fixed element.

According to further embodiments, the movable element includes a truss structure, the truss structure including the first coupler and the third coupler, wherein the third coupler is positioned above the first coupler.

According to further embodiments, the secondary load path is configured to oppose the primary load path during the actuation of the actuator.

According to further embodiments, the motion of the movable element is a first motion of the movable element, and wherein the secondary load path is configured to slow a second motion of the movable element upon a failure of the primary load path.

According to further embodiments, the actuator is a linear actuator that extends or retracts linearly, and wherein the damping unit is configured to passively extend or retract linearly.

According to further embodiments, the system further comprises an aircraft, wherein the movable element is a tiltable propulsion system of the aircraft.

According to further embodiments, the movable element is a tiltable propulsion system, the fixed element a support structure, and the system further comprises an aircraft including a fuselage; a pair of wings coupled to opposite sides the fuselage; the support structure, wherein the support structure is coupled to one of the pair of wings; and the tiltable propulsion system, wherein the tiltable propulsion system is coupled to the support structure.

According to further embodiments, the first position is a vertical flight configuration, and the second position is a forward flight configuration.

According to further embodiments, the system further comprises a load measurement device configured to measure a load on the actuator; a control system configured to control the actuator, and further configured to: control the actuator to actuate; receive, from the load measurement device, information about the load on the actuator; and determine, based on the load on the actuator, a condition of the damping unit.

Additionally, embodiments provide a method comprising: controlling, by a control system, an actuator to actuate to move a movable element, wherein the actuator is coupled to the movable element, a damping unit is coupled to the movable element, and the damping unit is configured to provide a damping force that opposes a motion of the movable element; determining, by the control system, a load on the actuator during the motion of the movable element; comparing, by the control system, the load on the actuator to a predetermined threshold value; and determining, by the control system, that the damping unit is operational when the load on the actuator exceeds the predetermined threshold value.

According to further embodiments, the determining the load on the actuator during the motion of the movable element includes receiving, from a load measurement device, a measured parameter; and calculating, based on the measured parameter, the load on the actuator.

According to further embodiments, the load measurement device is a current meter, and the measured parameter is an amount of electric current being drawn by the actuator.

According to further embodiments, a magnitude of the damping force is based on a speed of the motion of the movable element, where a higher speed causes a larger magnitude.

According to further embodiments, the load on the actuator exceeding the predetermined threshold value indicates that the damping unit is applying the damping force to the movable element and the actuator.

According to further embodiments, the predetermined threshold value is based on a previous load on the actuator during a previous motion of the movable element when the damping unit was disengaged.

According to further embodiments, the actuator actuates linearly between an extended position and a retracted position, the damping unit is configured to passively extend or retract linearly, the damping unit is configured to resist an extension or a retraction, and the motion of the movable element causes the extension or the retraction of the damping unit.

According to further embodiments, the actuator provides a primary load path between the movable element and a fixed element, the damping unit provides a secondary load path between the movable element and the fixed element, the secondary load path opposes the primary load path, and the determining that the damping unit is operational includes determining that the secondary load path is functioning.

According to further embodiments, the motion of the movable element is a first motion of the movable element, and wherein, upon a failure of the primary load path, the secondary load path slows a second motion of the movable element.

According to further embodiments, the movable element is a tiltable propulsion system coupled to an aircraft, the motion is a tilting motion, and the controlling the actuator to actuate is performed while the aircraft is at rest on a surface, and further comprising: after the determining that the damping unit is operational, initiating a flight process.

Further details regarding embodiments of the invention can be found in the Detailed Description and the Figures.

BRIEF DESCRIPTION OF THE DRAWINGS

Various embodiments of the invention are disclosed in the following detailed description and the accompanying drawings. In the appended figures, similar components or features may have the same reference label. Further, various components of the same or similar type may be distinguished by following the reference label by a dash and a second label that distinguishes among the similar components.

FIG. 3 illustrates a method for testing the condition of a damping unit, according to various embodiments.

DETAILED DESCRIPTION

Techniques disclosed herein relate generally to a damping unit providing a backup load path in case of failure of a primary load path. More specifically, techniques disclosed herein can apply to an aircraft including tiltable propulsion systems. An actuator configured to drive a tiltable propulsion system provides a primary load path, while the damping unit provides a secondary load path that slows uncontrolled motion of the tiltable propulsion system in the event of failure of the actuator.

Embodiments further provide a method testing the working condition of the damping unit. While the aircraft is at rest, the actuator can tilt the tiltable propulsion system, and a load on the actuator can be determined. For example, an amount of power being used by the tiltable propulsion system can be measured and used to determine the amount of force being used by the actuator to move the tiltable propulsion system. Due to configurations of the damping unit described herein, a functioning damping unit resists the movement of the propulsion system, and therefore increases the load on the actuator. If the load is greater than a predetermined threshold, it can be determined that the damping unit is providing a damping force against the actuator, and therefore the damping unit is operational. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Figures 1A, 1B:
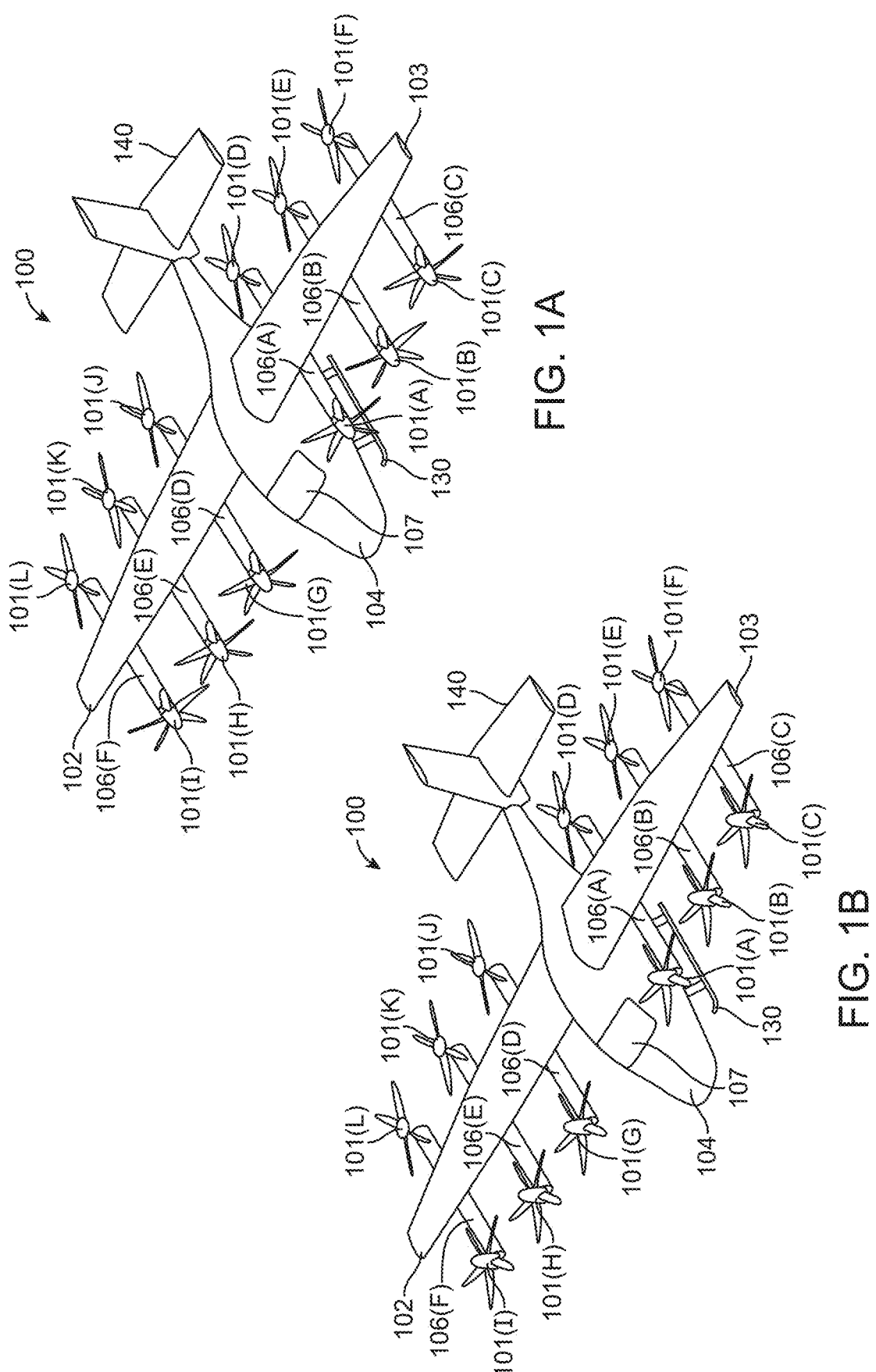
FIGS. 1A-1B depict planar views an exemplary aircraft with tilting fans in forward and vertical configurations, respectively, according to embodiments.

FIGS. 1A and 1B depict planar views of an exemplary aircraft 100, according to embodiments. The aircraft 100 can be any suitable type of flying vehicle, such as an airplane, a helicopter, a drone or a hybrid-type flying vehicle. In some embodiments, the aircraft 100 may be capable of vertical take-off and landing (VTOL). The aircraft 100 can be configured for human piloting, remote piloting, and/or autonomous flight.

In the example shown, aircraft 100 includes a fuselage 104 that may include a cabin section (e.g., toward the nose) for carrying passengers and/or cargo. A pair of wings including a first wing 102 and a second wing 103 can be mounted on or otherwise attached to the fuselage 104. The pair of wings can be coupled to opposite sides of the fuselage, and can take any suitable shape and configuration. For example, the pair of wings can be rectangular straight wings, tapered straight wings, rounded or elliptical straight wings, swept wings, delta wings, or any other suitable type of wing. In some embodiments, the first wing 102 and the second wing 103 may be coupled to the fuselage 104 in a high-wing configuration. That is, the first wing 102 and the second wing 103 may be mounted on an upper portion of the fuselage 104, as shown in FIGS. 1A-1B.

The aircraft 100 can also include support structures 106 (A)-(F), which may be coupled to the wings 102, 103. As shown in FIGS. 1A-1B, each of the support structures 106(A)-(F) may take the form of a boom, though embodiments include any other suitable structure. Six support structures 106(A)-(F) are shown in FIGS. 1A-1B, where three support structures 106(A)-(F) are provided under each of the pair of wings 102, 103. The support structures 106(A)-(F) may be coupled to the undersides of the pair of wings, and may include a forward portion extending forward beyond the wing and an aft portion extending aft of the wing.

In some embodiments, each of the support structures 106(A)-(F) are identical, and therefore the support structures 106(A)-(F) may be interchangeable between the positions on the wings. For example, a first support structure 106(A) closer to the fuselage may be interchangeable with an adjacent second support structure 106(B) (e.g., the middle boom on the wing) or a further third support structure 106(C) (e.g., the boom furthest away from the fuselage).

Propulsion Systems

The aircraft 100 can also include propulsion systems 101(A)-(L). While twelve propulsion systems 101(A)-(L) are shown in FIGS. 1A-1B, any suitable number of propulsion systems 101(A)-(L) can be included. The propulsion systems 101(A)-(L) may be coupled to the pair of wings 102, 103, and may be divided equally between the wings. In some embodiments, as shown in FIGS. 1A-1B, one or more of the propulsion systems 101(A)-(L) may be mounted on the support structures 106(A)-(F). For example, pairs of propulsion systems 101(A)-(L) may be mounted on opposite ends of a respective support structure 106(A)-(F), with one propulsion system mounted forward of the wing and another propulsion system mounted aft of the wing. In other embodiments, one or more of the propulsion systems 101(A)-(L) may be coupled directly to the wings. The number of booms and/or propulsion systems may vary according to the flight needs and requirements of the aircraft 100.

According to various embodiments, each of the propulsion systems 101(A)-(L) may be configured to provide thrust to the aircraft 100. The thrust from one or more of the propulsion systems 101(A)-(L) can be used to move, control, and/or stabilize the aircraft 100. The propulsion systems 101(A)-(L) can take the form of any suitable mechanism for providing thrust. In one example, a propulsion system may include a rotor (e.g., a fan). A propulsion system can also include a drive mechanism for the rotor, such as a dedicated electric motor (e.g., in the case of electric vehicles).

A rotor may comprise any suitable number of rotor blades (e.g., 2 blades, 3 blades, 4 blades, 5 blades, 6 blades, 7 blades, or 8 blades). The rotor blades may be spaced equally or unequally. The rotor may further comprise a hub. The rotor blades may be attached to the hub. In some embodiments, the rotor blades and an integral hub may be manufactured as a single piece. The hub provides a central structure to which the rotor blades connect, and in some embodiments is made in a shape that envelops the motor.

The rotor blades may have a predetermined pitch or a predetermined angle of attack. In some embodiments, all rotor blades may have the same pitch or the same angle of attack. In other embodiments, at least two rotor blades may have different pitches or angles of attack than each other.

In some embodiments, one or more rotor blades of a propulsion system may have adjustable pitch settings (also referred to as variable pitch positions). Such a propulsion system may be referred to as a variable pitch propeller. In a variable pitch propeller, the blade pitch of one or more rotor blades may be adjusted during flight. The blade pitch can thus be adjusted to optimize for thrust and/or efficiency based on a phase of flight, such as takeoff, climb or cruise. For example, a fine pitch setting, which may provide greater thrust, may be used during take-off, acceleration, gaining altitude, and/or landing. A coarser pitch, which may provide better efficiency, may be used for high-speed cruise flight. An example of a low pitch used during take-off is about 15 degrees. An example of a high pitch used during cruise flight is about 40 degrees.

The amount of thrust produced by a rotor blade is dependent on the speed and the angle of attack of the rotor blade. The effective angle of attack of the rotor blade may decrease as airspeed increases. To maintain a constant effective angle of attack or otherwise optimum effective angle of attack, the blade pitch may be increased.

In some embodiments the motor parts are low-profile so that the entire motor fits within the hub of the rotor, presenting lower resistance to the air flow when flying forward. The rotor can be attached to the rotating part of the motor. The stationary part of the motor can be attached to a support structure. In some embodiments the motor can be a permanent magnet motor and can be controlled by an electronic motor controller. The electronic motor controller can send electrical currents to the motor in a precise sequence to allow the rotor to turn at a desired speed or with a desired torque.

According to various embodiments, the aircraft 100 may be an electrically powered aircraft or a hybrid-electric aircraft. One or more battery units may be included in the aircraft 100 (e.g., within the fuselage 104) and configured to provide power to various aircraft components, such as one or more electric motors and/or on-board computer systems. The propulsion systems 101(A)-(L) may be driven by electric motors that are powered by an electric power system including the one or more battery units. In some embodiments, each of the propulsion systems 101(A)-(L) may be coupled to a dedicated battery unit. Alternatively, there may be a one-to-many relationship between the one or more battery units and the propulsion systems 101(A)-(L). In some cases, one or more battery units may be the sole power source for the aircraft 100. Each battery unit may include one or more battery cells.

Propulsion System Orientation-Vertical

According to various embodiments, one or more of the propulsion systems 101(A)-(L) may be positioned, oriented, and/or otherwise configured to provide thrust and/or movement to the aircraft 100 in a predefined direction. For example, one or more of the propulsion systems 101(A)-(L) may be configured to provide thrust upward in a vertical direction. As shown in FIG. 1A, these can include propulsion systems 101(D), 101(E), 101(F), 101(J), 101(K), and/or 101(L). Propulsion systems that are configured to provide thrust in a vertical direction may also be referred to as vertical fans or lift fans, or may be referred to as propulsion systems having a lift orientation or a hover orientation. Vertical fans may be used to generate vertical thrust (e.g., lift) for taking off, landing, hovering, stabilizing, and/or controlling the aircraft 100.

A vertical direction may be defined relative to the body of the aircraft 100. For example, a vertical direction can be the aircraft's vertical axis or z-axis (e.g., the plumb line that intersects the zenith and is orthogonal to the ground when the aircraft 100 is on the ground at rest, or hovering just above the ground). In some embodiments, the vertical direction may be orthogonal to the ground when the aircraft 100 is on the ground at rest and/or in a stable hover just above the ground in a level orientation. If the aircraft 100 is tilted, the aircraft's z-axis (and the vertical direction) may no longer be orthogonal to the ground. Vertical thrust may be thrust in a vertical direction (e.g., up or down).

Vertical thrust can be achieved by installing the vertical fans and/or their corresponding support structures 106(A)-(F) so that the rotational axis of each of the vertical fans is parallel with the vertical direction and/or orthogonal to a direction of forward flight. In other words, the vertical fans may be oriented such that their rotor blades rotate within a horizontal plane (e.g., a plane that is horizontal relative to the fuselage, or a plane defined by the x-axis and y-axis of the aircraft 100) and about the vertical axis (e.g., the z-axis of the aircraft 100). In some embodiments, the vertical fans may be configured so that each set of rotor blades rotate within the same plane. In other embodiments, the vertical fans may be configured so that one or more of the sets of rotor blades rotate within different planes (e.g., parallel planes).

In other embodiments, some or all of the vertical fans are oriented at an angle, so that on an individual level, one or more vertical fans have rotor blades that do not rotate within a horizontal plane, and do not provide thrust that is completely vertical, but instead provide thrust in a direction that is angled relative to vertical. However, in combination, a set of angled vertical fans can together provide a net thrust in the vertical direction. For example, a non-vertical thrust component provided by an angled vertical fan on the first wing 102 can be counteracted by an equal and opposite non-vertical thrust component provided by an oppositely angled vertical fan on the second wing 103.

In some embodiments, two adjacent vertical fans may have their blades mounted with opposite angles of attack such that their rotor blades spin in opposite directions. Adjacent vertical fans may refer to two vertical fans (e.g., 101A and 101D) that are coupled to opposite ends of the same support structure 106(A), or two vertical fans (e.g., 101A and 101B) that are on different support structures, or two vertical fans (e.g., 101A and 101G) that are on different wings.

According to various embodiments, a first subset of vertical fans may spin in a first direction, and a second subset (e.g., remainder) of vertical fans may spin in a second direction, opposite to the first direction. Configuring the vertical fans so that some spin in a first direction and other spin in an opposite second direction can advantageously cancel out any angular momentum created by the spinning blades so that the aircraft 100 can hover in a stable manner without rotating.

Further, rotational movement about the vertical axis of the aircraft 100 (e.g., yaw) can be performed when desired by temporarily reducing the spin rotational rate of some or all a first subset of vertical fans spinning in a first direction, and/or by temporarily increasing the spin rotational rate of a second subset of the vertical fans spinning in a second direction so that the total angular momentum created by the spinning blades does not cancel out. Accordingly, the aircraft 100 can rotate with the use of vertical fans without needing another source of thrust oriented in another direction.

Propulsion System Orientation-Horizontal

According to various embodiments, one or more of the propulsion systems 101(A)-(L) may be configured to provide thrust forward in a horizontal direction. As shown in FIG. 1A, these can include propulsion systems 101(A), 101(B), 101(C), 101(G), 101(H) and/or 101(I). Propulsion systems that are configured to provide thrust in a horizontal direction may also be referred to as horizontal fans or propellers, or may be referred to as propulsion systems having a forward flight orientation. Horizontal fans may be used to provide horizontal thrust for forward flight, climb, descent, and/or cruise. As shown in FIGS. 1A-1B, two propulsion systems of the same type (e.g., two vertical fans) or of different types (e.g., one vertical fan and one horizontal fan) can be mounted on each of the support structures 106(A)-(F).

A horizontal direction may be defined relative to the body of the aircraft 100. For example, a horizontal direction can be the aircraft's forward axis or x-axis. In some embodiments, the horizontal direction may be parallel to the ground when the aircraft 100 is on the ground at rest, in a stable hover just above the ground in a level orientation, and/or in a forward flight condition. If the aircraft 100 is tilted, the aircraft's x-axis (and the horizontal direction) may no longer be parallel to the ground. Horizontal thrust may be thrust in a horizontal direction (e.g., forward or backward).

Horizontal thrust (e.g., forward thrust) can be achieved by installing the horizontal fans and/or their corresponding support structures 106(A)-(F) so that the rotational axis of each of the horizontal fans is parallel with the horizontal direction and/or parallel to a direction of forward flight. In other words, the horizontal fans may be oriented such that their rotor blades rotate within a vertical plane (e.g., a plane defined by the z-axis and y-axis of the aircraft 100) and about the forward axis (e.g., the x-axis of the aircraft 100). In some embodiments, the horizontal fans may be configured so that each set of rotor blades rotate within the same plane. In other embodiments, the horizontal fans may be configured so that one or more of the sets of rotor blades rotate within different parallel planes.

In some embodiments, the horizontal fans may be configured to have the capability of spinning in either direction. As a result, the horizontal fans may be able provide a reverse thrust. A reverse thrust can be useful for moving the aircraft 100 in a backward direction (e.g., backing out of a hangar area from a hover position). Additionally, a reverse thrust can be used to reduce forward flight velocity. For example, reverse thrust from the horizontal fans can be used in instead of, or in addition to, flaps to slow the aircraft 100 and/or bring the aircraft 100 to a stationary hover.

In some embodiments, the horizontal direction and the vertical direction may be orthogonal to one another. Accordingly, vertical fans and horizontal fans may provide thrust in substantially orthogonal directions. In other embodiments, the vertical fans and horizontal fans may provide thrust that is about orthogonal or nearly orthogonal, but not exactly orthogonal. Isolating the directional thrusts into two separate types of components can beneficially simplify the control and design of the aircraft 100. In some embodiments, the horizontal fans and the vertical fans can be operated, powered on, and otherwise controlled independently from one another, thereby allowing thrust to be applied independently in the orthogonal directions (e.g., thrust can be applied in the different directions at the same time and at different times).

A combination of the horizontal fans and wings 102, 103 may achieve both forward movement and lift. In some embodiments, it may be more efficient to utilize the horizontal fans and wings 102, 103 to achieve vertical lift, instead of the vertical fans. Once the aircraft 100 reaches a sufficient speed (e.g., predetermined amount of speed, or a cruising speed) so that the wings provide sufficient lift to the aircraft 100, the vertical fans may no longer be needed to provide lift, and the vertical fans may temporarily stop operating. For example, the vertical fans may initially be active and generate vertical thrust to lift the aircraft 100. Once the aircraft 100 is off the ground and/or at a certain height, the horizontal fans can activate and/or increase the horizontal thrust so that the aircraft 100 gains horizontal velocity. The vertical fans may continue providing vertical lift while horizontal velocity increases, as the wings 102, 103 may not provide sufficient vertical lift until a predetermined speed (e.g., a cruising speed) is achieved. The vertical fans may eventually (or gradually) reduce their vertical thrust contribution as the wings 102, 103 gradually provide more (e.g., an increasing amount of) vertical lift during the increasing horizontal velocity. Later on, as the aircraft 100 slows or returns to a hover position, the vertical fans can reactivate and/or increase vertical thrust.

Propulsion System Orientation-Fixed

According to various embodiments, one or more of the propulsion systems 101(A)-(L) may have a fixed orientation. For example, one or more of the propulsion systems 101 (A)-(L) may be mounted in a fixed orientation relative to a respective wing 102 or 103, a respective support structure 106(A)-(F), and/or the aircraft 100. While the rotor blades of a fixed propulsion system can rotate when activated, the orientation of the propulsion system housing and structure may not be rotatable with respect to the aircraft 100. As a result, a fixed propulsion system can be configured to provide thrust in a constant direction relative to the aircraft 100. The thrust direction and orientation of a fixed propulsion system relative to the aircraft 100 (e.g., the fuselage, wings, and/or support structures) may not change or move, regardless of the current activities of the aircraft 100 and/or direction of movement (e.g., both forward flight and vertical flight), according to embodiments.

In some embodiments, one or more vertical fans may have fixed orientations. For example, one or more of propulsion systems 101(D), 101(E), 101(F), 101(J), 101(K), and/or 101(L) may have fixed vertical orientations. These may be referred to as fixed vertical fans.

Further, according to some embodiments, one or more of the horizontal fans may have fixed orientations. For example, propulsion systems 101(A), 101(B), 101(C), 101

(G), 101(H) and/or 101(I) may have fixed horizontal orientations. These may be referred to as fixed horizontal fans.

In some embodiments, all of the propulsion systems 101(A)-(L) may have fixed orientations. As a result, the vertical fans and the horizontal fans may be permanently configured to provide thrust in orthogonal (or substantially orthogonal) directions.

Propulsion System Orientation-Tiltable

In other embodiments, one or more of the propulsion systems 101(A)-(L) may be configured to change orientation. For example, one or more of the propulsion systems 101(A)-(L) may be configured and/or mounted in a manner that allows the angle and orientation to be tiltable relative to a respective wing 102 or 103, a respective support structure 106(A)-(F), and/or the aircraft 100. As a result, a tilting propulsion system, which may also be referred to as a tiltable propulsion system or a tilting fan, can be configured to provide thrust in more than one direction relative to the aircraft 100.

As discussed above, propulsion systems 101(A), 101(B), 101(C), 101(G), 101(H) and/or 101(I) may take the form of fixed horizontal fans. However, in other embodiments, one or more of propulsion systems 101(A), 101(B), 101(C), 101(G), 101(H) and/or 101(I) may instead take the form of tilting fans. Such tilting fans may be configured to switch (e.g., rotate or tilt) between a horizontal orientation and a vertical orientation. Horizontal orientation can also be referred to as horizontal direction, forward flight configuration, second tilt configuration, a second position, and/or second tilt angle. Vertical orientation can also be referred to as vertical direction, vertical flight configuration, first tilt configuration, a first position, and/or first tilt angle. FIG. 1A illustrates the tilting fans as currently set to a forward flight configuration (also referred to as a second tilt configuration or a second tilt angle). FIG. 1B illustrates the tilting fans as currently set to a vertical flight configuration (also referred to as a first tilt configuration or first tilt angle).

As shown in FIG. 1B, all of the propulsion systems 101(A)-(L) may have a vertical orientation. Some of these may be vertical fans with a fixed vertical orientation (e.g., propulsion systems in the back row locations at 101(D), 101(E), 101(F), 101(J), 101(K), and/or 101(L)), while others may be tilting fans that are currently and temporarily set to have a vertical orientation or a vertical flight configuration (e.g., propulsion systems in the front row locations at 101(A), 101(B), 101(C), 101(G), 101(H) and/or 101(I)). The tilting fans may have an orientation that is the same as or similar to that of the vertical fans. FIG. 1A illustrates the tilting fans (e.g., propulsion systems in the front row locations at 101(A), 101(B), 101(C), 101(G), 101(H) and/or 101(I)) in a forward flight configuration.

Embodiments allow the aircraft 100 to include any suitable combination and number of tilting fans, fixed horizontal fans, and/or fixed vertical fans. Also, each type of fan can be located at any suitable position along the wings 102, 103 and/or at any suitable support structure 106(A)-(F). The type of propulsion system at each location may be selected to enhance any number of flight characteristics including forward thrust, vertical thrust, maneuverability, drag, and/or any suitable flight characteristic.

While tilting fans can provide the ability to increase thrust in a specific direction as desired, it can be beneficial to incorporate one or more propulsion systems with fixed orientations in order to reduce weight, reduce moving parts, reduce possible failure points, and/or reduce maintenance concerns.

Figure 2A:
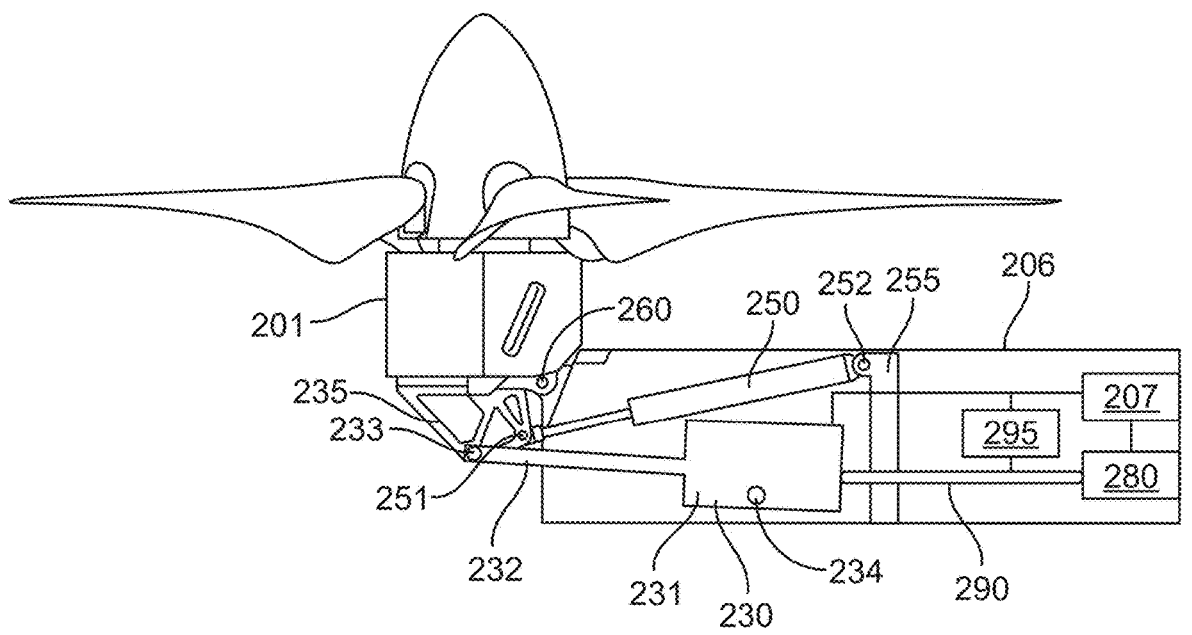
FIG. 2A illustrates an example of a illustrate an example of a tilting propulsion system in a vertical flight configuration, according to embodiments.
Figure 2B:
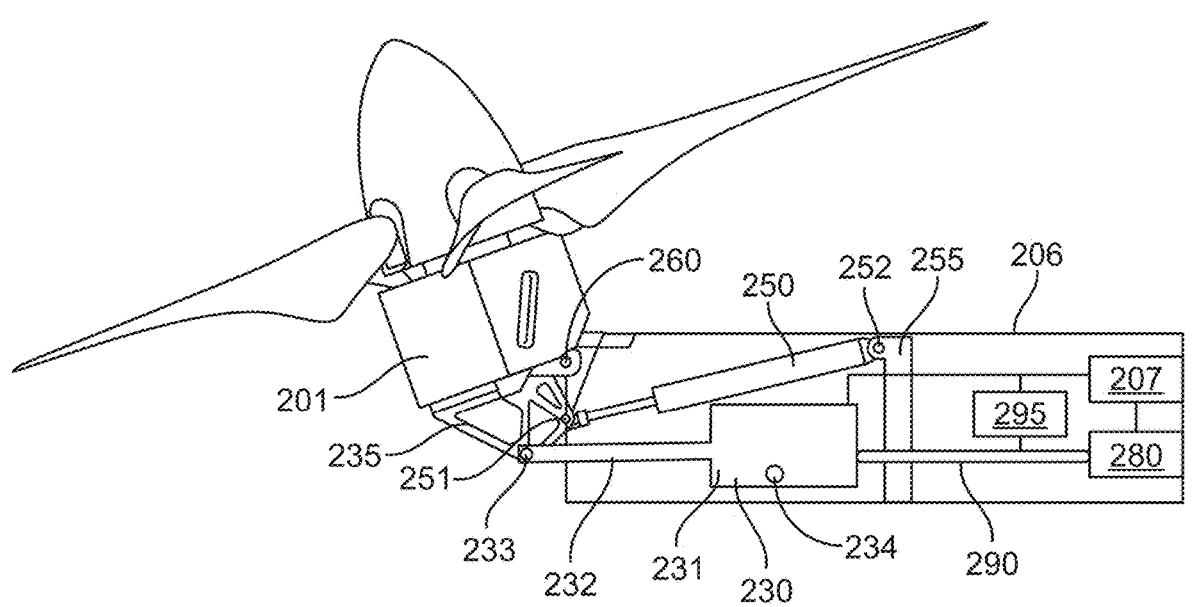
FIG. 2B illustrates an example of a illustrate an example of a tilting propulsion system in a first intermediary tilt configuration, according to embodiments.
Figure 2C:
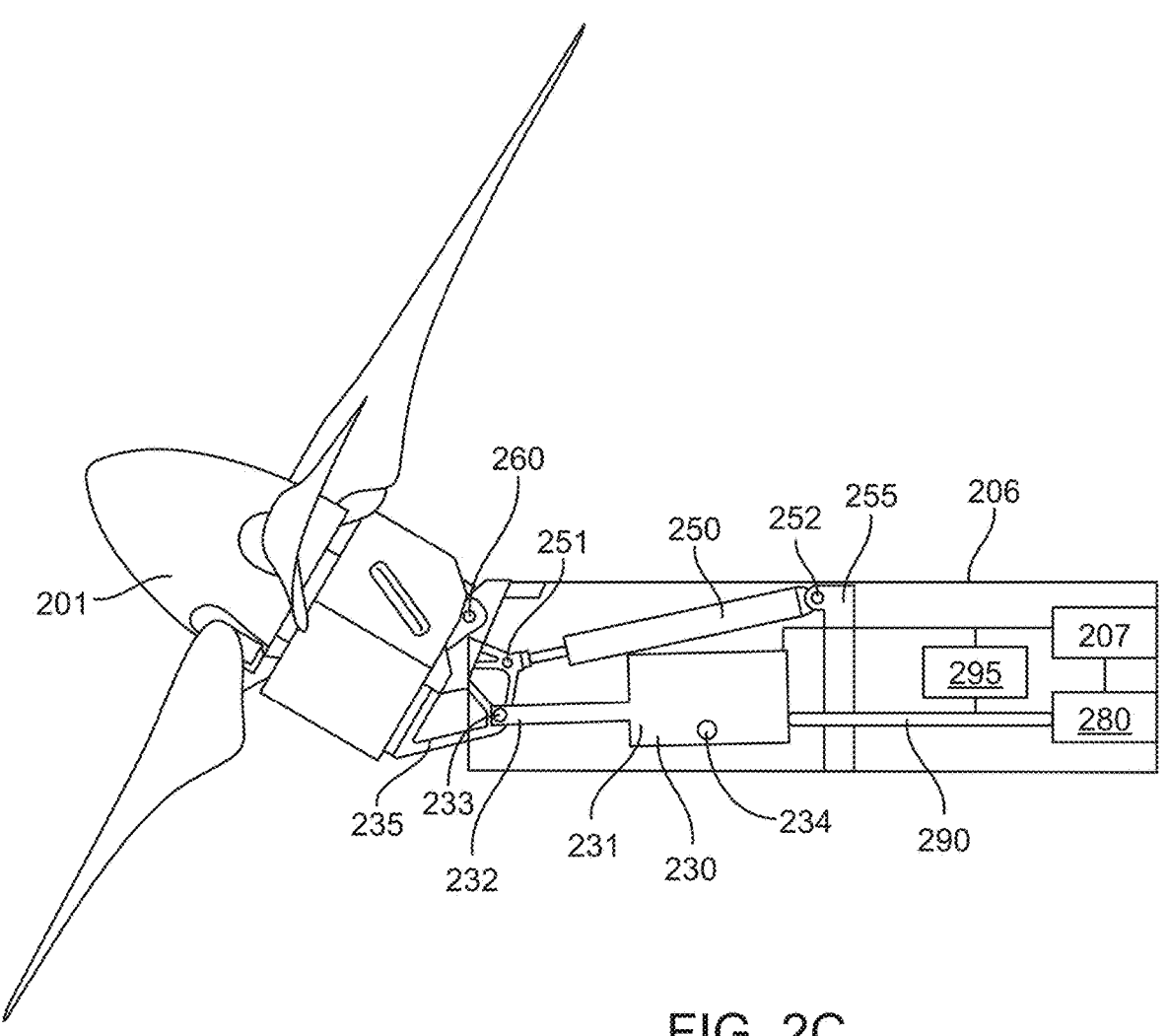
FIG. 2C illustrates an example of a illustrate an example of a tilting propulsion system in a second intermediary tilt configuration, according to embodiments.
Figure 2D:
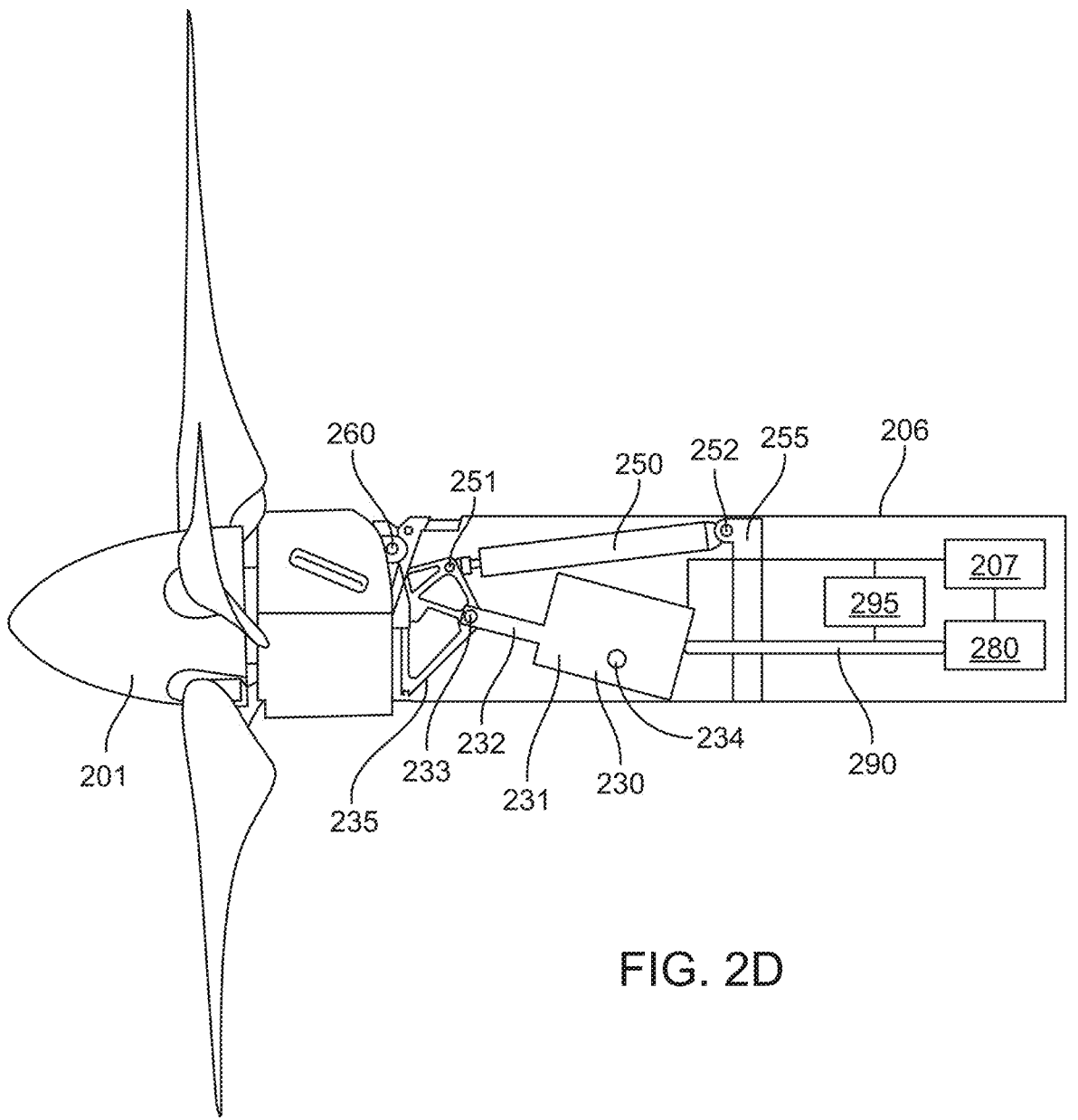
FIG. 2D illustrates an example of a illustrate an example of a tilting propulsion system in a forward flight configuration, according to embodiments.

FIGS. 2A-2D illustrate an example of a propulsion system 201 that is configured to tilt. One or more of the propulsion systems 101(A)-(L) of FIGS. 1A-1B can take the form of the propulsion system 201 illustrated in FIGS. 2A-2D. The propulsion system 201 (also referred to as a tilting fan) may be configured to tilt through a predefined range of tilt configurations. The tilt configurations can include a vertical flight configuration (e.g., 90 degrees, or about 90 degrees) as illustrated in FIG. 2A, a forward flight configuration (e.g., 0 degrees, or about 0 degrees) as illustrated in FIG. 2D, and/or any other suitable number of intermediary tilt configurations between the vertical flight configuration and the forward flight configuration, such as a first intermediary tilt configuration as illustrated in FIG. 2B and a second intermediary tilt configuration as illustrated in FIG. 2C.

The propulsion system 201 can be controlled to switch between the tilt configurations to provide additional thrust in any suitable direction, depending on current movement needs of aircraft. For example, during takeoff, landing, and/or hovering, the propulsion system 201 may be set to the vertical flight configuration to provide additional vertical thrust. During forward cruising flight, the propulsion system 201 may be set to the forward flight configuration to provide horizontal thrust. During stages of forward acceleration, deceleration, altitude gaining, and/or altitude decreasing, the propulsion system 201 may be set to an intermediary tilt angle and configuration to provide both a horizontal thrust component and a vertical thrust component.

According to embodiments, the propulsion system 201 may be gradually tilted, iteratively tilted, or otherwise pass through multiple different intermediary tilt angles based on the stage of flight and/or aircraft needs. For example, during forward acceleration and/or an altitude gaining stage of flight, the propulsion system 201 can gradually tilt (e.g., 0.5 degrees at a time, 1 degree at a time, etc.) from vertical toward horizontal as speed is gained and/or altitude is gained.

In some embodiments, the vertical flight configuration may be a maximum tilt, and the forward flight configuration may be a minimum tilt of the propulsion system 201. In other embodiments, the propulsion system 201 may be capable of tilt angles and configurations beyond the vertical flight configuration (e.g., angled past vertical so that there is a reverse horizontal component) and/or tilt angles and configurations lower than the forward flight configuration (e.g., angled below horizontal so that there is a downward component).

Tilting Mechanism

A tilting mechanism can be configured to cause the propulsion system 201 to tilt. A tilting mechanism can include one or more controllable components that are coupled to the propulsion system 201 and/or a support structure 206, which can thereby enable relative position and angle changes between the propulsion system 201 and the support structure 206, according to embodiments. The support structure 206 can also be referred to as a fixed element. The propulsion system 201 can be referred to as a movable element, as it may move relative to the fixed element. According to embodiments, the motion may be a tilting motion. As illustrated in FIGS. 2A-2D, the tilting mechanism can include an actuator 230, a revolute joint 260, and/or any other suitable components. The tilting mechanism 220 shown in FIGS. 2A-2D is for exemplary purposes, and embodiments allow any other suitable tilting mechanism components and configurations.

The revolute joint 260 can include a rotatable coupling between the propulsion system 201 and the support structure 206. The revolute joint 260, also referred to as a hinge or a pin joint, can include a pin, bolt, a rotary bearing, and/or any other suitable components.

The actuator 230 can be any suitable device configured to cause motion. According to embodiments, any suitable type of actuator 230 can be utilized for causing motion (e.g., tilting motion) at the propulsion system 201. For example, the actuator 230 can take the form of a linear actuator. A linear actuator can include any suitable device configured to cause linear motion. A linear actuator can be configured to convert rotary motion (e.g., from a rotating rotor and/or gears) into linear motion (e.g., of a rod or shaft). A linear actuator may be a 2-force member actuator, providing force along an axis in either direction. Examples of linear actuators include ball screws, cam actuators, wheel and handle actuators, and the like.

The actuator 230 can be coupled to the propulsion system 201. For example, the propulsion system 201 can include a truss structure 235, and the actuator 230 can be coupled to the truss structure 235. In some embodiments, the truss structure 235 can include a rigid framework. For example, the truss structure 235 can include an assembly of members (e.g., beams or other structural components) connected by nodes (e.g., joints), together forming the rigid framework. The members can be two-force members, and the members can be organized so that the assemblage as a whole behaves as a single object.

Embodiments include any suitable coupling between the actuator 230 and the propulsion system 201. In some embodiments, a first coupler 233 can couple the actuator 230 to the truss structure 235 of the propulsion system 201. The first coupler 233 can include one or more of a pin, bolt, spherical joint, trunnion joint, fixed bracket, pivot bracket, shackle, gimble, and/or any other suitable structural coupling and/or mounting mechanisms. In some embodiments, the first coupler 233 can incorporated into the truss structure 235 and/or otherwise a part of the truss structure 235.

The actuator 230 can also be coupled to the support structure 206. According to embodiments, a second coupler 234 can couple the actuator 230 to the support structure 206. The second coupler 234 can include one or more of a pin, bolt, spherical joint, trunnion joint, fixed bracket, pivot bracket, shackle, gimble, and/or any other suitable structural coupling and/or mounting mechanisms.

According to embodiments, the support structure 206 may surround the actuator 230. The support structure 206 can be a hollow structure partially enclosing the actuator 230. In the illustrations in FIGS. 2A-2D, a portion of the support structure 206 is not shown in order to reveal internal components (e.g., the actuator 230 and damping unit 250) disposed within the support structure 206.

According to some embodiments, the actuator 230 can include a translating component 232 and an actuating component 231.

The actuating component 231 can take the form of a motor, one or more gears (e.g., a gear box), and/or an engaging component, according to some embodiments. The motor can be an electric motor, which can include a stator and a rotor. The rotor can be coupled to and cause rotation of the one or more gears. The one or more gears can be coupled to the engaging component, which can include a drive nut, slide block, ball nut, lead nut, or the like. The engaging component can engage to the translating component 232, and cause the translating component 232 to move. In some embodiments, the engaging component can include ball bearings that recirculate on an internal track. Embodiments allow the actuator 230 to include a local power source (e.g., a battery), and/or be connected to a separate aircraft power source (e.g., a battery). Additionally, embodiments allow the actuating component 231 to instead include other suitable source of power and/or motion, such as a hydraulic system.

The translating component 232 can be configured to move (e.g., extend or retract linearly) when actuated by the actuating component 231. The translating component 232 can take the form of a rod, shaft, lead screw, or any other suitable elongated object. The translating component 232 can be threaded or include ball grooves. The translating component 232 can be extendable (e.g., a "slider" configured for telescoping movement), and can thereby provide an extendable, retractable, and/or otherwise dynamic and adjustable coupling between the propulsion system 201 and the support structure 206. As the translating component 232 extends toward an extended position and retracts toward a retracted position, the propulsion system 201 can rotate about the revolute joint 260. Thereby, the propulsion system 201 is put into motion and the tilt configuration of the propulsion system 201 changes. For example, extension of the translating component 232 toward an extended position can cause the propulsion system 201 to move (e.g., tilt) upward toward a vertical flight configuration. Retraction of the translating component 232 toward a retracted position can cause the propulsion system 201 to tilt downward toward a forward flight configuration. Accordingly, the actuator 230 can be configured to provide linear motion that is converted into or otherwise causes rotary motion at the propulsion system 201.

As mentioned above, the actuator 230 (e.g., the translating component 232 of the actuator 230) can be configured to actuate linearly relative to its own structural body. Further, due to the coupling to the propulsion system 201, the actuator 230 may experience a pivoting or rotational motion as a result of the linear actuation. As illustrated in FIGS. 2A-2D, as the propulsion system 201 tilts, the first coupler 233 may move with the propulsion system 201, and the actuator 230 may be caused to pivot due to the first coupler 233 moving while the second coupler 234 maintains a fixed position on the support structure 206. The actuator 230 may pivot about an axis (referred to as a first axis) located at the second coupler 234.

Damping Unit

As illustrated in FIGS. 2A-2D, a damping unit 250 can also be included as a part of the tilting mechanism or as an addition to the tilting mechanism. As mentioned above, FIG. 2A illustrates an example of the propulsion system 201 in a vertical flight configuration. FIG. 2B illustrates an example of the propulsion system 201 in a first intermediary tilt configuration. FIG. 2C illustrates an example of the propulsion system 201 in a second intermediary tilt configuration. FIG. 2D illustrates an example of the propulsion system 201 in a forward flight configuration. In each of these illustrates, the damping unit 250 can be coupled to the propulsion system 201, and the damping unit 250 may be in a corresponding state of extension or retraction due to the tilt configuration of the propulsion system 201.

The damping unit 250 can be a device configured to provide a damping force. The damping unit 250 can absorb and dissipate kinetic energy. The damping unit 250 can be a mechanical device, a hydraulic device, a pneumatic device, an electromagnetic device, and/or any other suitable device configured to resist motion. As examples, the damping unit 250 can include one or more springs, cushions, pneumatic shock absorbers, hydraulic shock absorbers, dashpots, and/or the like.

In some embodiments, the damping unit 250 can take the form of a dashpot. A dashpot can use viscous friction to resist motion. For example, a dashpot can include a cylinder with a piston immersed in a viscous fluid. An external force acting on the piston causes the piston to move through the viscous fluid. The viscous fluid provides resistance to the movement of the piston, and the piston thereby experiences a resistance force opposite the direction of the external force.

According to embodiments, the damping unit 250 can resist motion in one direction or in two directions. The second direction may be opposite the first direction. In some embodiments, the damping unit 250 can provide a relatively greater resistance to motion in the first direction and a relatively smaller resistance to motion in the second direction. The damping unit 250 can include an elongated cylinder, rod, and/or piston. The one or more directions of resistance can be along the axis of the elongated cylinder, rod, and/or piston.

As illustrated FIGS. 2A-2D, the damping unit 250 can be coupled to the propulsion system 201. For example, the damping unit 250 can be coupled to the truss structure 235 of the propulsion system 201.

Embodiments include any suitable coupling between the damping unit 250 and the propulsion system 201. In some embodiments, a third coupler 251 can couple the damping unit 250 to the truss structure 235 of the propulsion system 201. The third coupler 251 can include one or more of a pin, bolt, spherical joint, trunnion joint, fixed bracket, pivot bracket, shackle, gimble, and/or any other suitable structural coupling and/or mounting mechanisms. In some embodiments, the third coupler 251 can incorporated into the truss structure 235 and/or otherwise a part of the truss structure 235.

According to embodiments, the damping unit 250 can be coupled to the truss structure 235 of the propulsion system 201 at a location that is higher than the coupling between the actuator 230 and the truss structure 235 of the propulsion system 201. For example, the third coupler 251 can be positioned vertically above the first coupler 233. The horizontal position of the third coupler 251 relative to the first coupler 233 may change according to the tilt configuration of the propulsion system 201, but the third coupler 251 may be positioned above the first coupler 233 for most or all tilt configurations.

The damping unit 250 can also be coupled to the support structure 206. For example, a frame element 255 may be provided within the support structure 206, and the damping unit 250 can be coupled to the frame element 255. The frame element 255 can take the form of an intermediate component, such as a bracket, or any other suitable structure for fixing a first component (e.g., the damping unit 250) to a second component (e.g., the support structure 206). In some embodiments, the frame element 255 can have a circular shape. The frame element 255 can be attached to the inner surface of the support structure 206, and can surround an internal space within the support structure 206. The frame element 255 can be positioned at a predetermined distance from a first end of the support structure 206 (e.g., the left side from the perspective shown in the illustrations).

Embodiments include any suitable coupling between the damping unit 250 and the support structure 206. In some embodiments, a fourth coupler 252 can couple the damping unit 250 to the frame element 255 of the support structure 206. The fourth coupler 252 can include one or more of a pin, bolt, spherical joint, trunnion joint, fixed bracket, pivot bracket, shackle, gimble, and/or any other suitable structural coupling and/or mounting mechanisms.

According to embodiments, the support structure 206 may surround the damping unit 250. The support structure 206 can be a hollow structure partially enclosing the damping unit 250. In the illustrations in FIGS. 2A-2D, a portion of the support structure 206 is not shown in order to reveal internal components (e.g., the actuator 230 and damping unit 250) disposed within the support structure 206. Both the actuator 230 and damping unit 250 can be provided within the same enclosure between the first end of the support structure 206 and the frame element 255. While a single damping unit 250 is illustrated, additional damping units can also be included that are coupled to the propulsion system 201 and the support structure 206.

The damping unit 250 can be configured to change length through extension and/or compression (also referred to as retraction). Due to being coupled to both the propulsion system 201 and the support structure 206 (e.g., at opposite ends of damping unit 250), the damping unit 250 can be passively extended and/or passively retracted when the propulsion system 201 is put into motion (e.g., tilting motion), as a dynamic position of the third coupler 251 may be moved closer or further from a fixed position of the fourth coupler 252. For example, when the propulsion system 201 tilts upward toward vertical, the damping unit 250 may experience a tension force which causes extension of the length of the damping unit 250. When the propulsion system 201 tilts downward toward horizontal, the damping unit 250 may experience a compression force which causes retraction or compression of the length of the damping unit 250.

The damping unit 250 can be configured to extend and/or retract linearly relative to its own structural body. Further, due to the coupling to the propulsion system 201, the damping unit 250 may experience a pivoting or rotational motion. As illustrated in FIGS. 2A-2D, as the propulsion system 201 tilts, the third coupler 251 may move with the propulsion system 201, and the damping unit 250 may be caused to pivot due to the third coupler 251 moving while the fourth coupler 252 maintains a fixed position on the frame element 255 of the support structure 206. The damping unit 250 may pivot about an axis (referred to as a second axis) located at the fourth coupler 252.

The damping unit 250 may be configured to resist or oppose one or both of extension and/or compression. Additionally, the damping unit 250 may be configured to provide a damping force with a magnitude that changes in response to a speed or rate of extension and/or compression. For example, the damping force may be proportionally or exponentially related to the speed of motion (e.g., length change) of the damping unit 250. Typically, a higher speed or faster movement (e.g., extension or compression) of the damping unit 250 causes a greater (e.g., larger magnitude) damping force. As a result, a relatively slower tilt motion of the propulsion system 201 may cause a relatively smaller damping force, while a relatively faster tilt motion of the propulsion system 201 may cause a relatively larger damping force.

As illustrated FIGS. 2A-2D, the third coupler 251 and fourth coupler 252 may have different positions than the first coupler 233 and the second coupler 234. In other words, the damping unit 250 and the actuator 230 may connect to the propulsion system 201 and the support structure 206 in different locations. Nonetheless, the damping unit 250 and the actuator 230 may each provide a structural coupling and/or a load path between the propulsion system 201 and the support structure 206.

The actuator 230 may be configured to provide a primary load path between the propulsion system 201 and the support structure 206. The actuator 230 may be configured to provide enough supportive force to modify, set, and maintain a tilt orientation of the propulsion system 201, even under large loads (e.g., tension and/or compression) caused by air resistance, gravity, thrust generated by the propulsion system 201, etc.

The damping unit 250 may be configured to provide a secondary load path (also referred to as a backup or redundant load path) between the propulsion system 201 and the support structure 206. The damping unit 250 may be configured to provide sufficient damping force to resist rapid and/or sudden tilt movements of the propulsion system 201, which can include large loads in the form of tension and/or compression. The damping unit 250 can have any suitable size (e.g., length, circumference, width), materials, and/or other configurations to provide a sufficient force under predefined conditions (e.g., a certain speed of tilt movement).

According to embodiments, the damping unit 250 may be configured to provide a damping force (e.g., either tension or compression) between the propulsion system 201 and the support structure 206 only when there is relative movement between the propulsion system 201 and the support structure 206 causing the damping unit 250 to passively extend or passively retract. For example, when a tilt configuration (also referred to as tilt position) of the propulsion system 201 is set and not currently changing, the damping unit 250 may not experience any extension or retraction, and therefore may not provide any damping force. In contrast, the actuator 230 may be providing structural support with sufficient force to maintain a set tilt configuration of the propulsion system 201.

When the actuator 230 is actuating to cause a change in tilt configuration of the propulsion system 201, the damping unit 250 may then experience extension or retraction, and therefore may provide a damping force. The damping unit 250 may provide a force that opposes the movement of the propulsion system 201, which may cause an extra load on the actuator 230 as it provides extra force to overcome the damping force. In other words, the actuator 230 of the primary load path may drive against the damping unit 250 of the secondary load path. Accordingly, the primary load path and the secondary load path may apply tilting force to the propulsion system 201 simultaneously and/or in opposite directions. However, according to embodiments, the actuator 230 may be controlled to change the tilt configuration slowly and gradually. As a result, the actuating can be controlled to cause only a relatively small damping force that is not difficult to overcome and/or lesser than other external forces (e.g., as caused by air resistance, gravity, and/or thrust).

The primary load path and the secondary load path may be considered parallel load paths. Parallel load paths may operate in parallel with one another. Operating in parallel can include providing two separate paths or branches of bearing load and/or providing force between the two components (e.g., the propulsion system 201 and the support structure 206). The primary load path and the secondary load path can operate in parallel even if the actuator 230 and damping unit 250 are not geometrically parallel (e.g., aligned or level with one another in three-dimensional space).

According to embodiments, the secondary load path may be configured to fully activate and bear some or all of the load between the propulsion system 201 and the support structure 206 upon failure of the primary load path. If the actuator 230 fails and no longer provides supportive force between the propulsion system 201 and the support structure 206, the propulsion system 201 may experience rapid movement. This rapid movement can cause a corresponding rapid extension and/or retraction of the damping unit 250, which in turn can cause the damping unit 250 to produce a large resisting force. The damping unit 250 can thereby provide a secondary load path with sufficient force to slow the tilting movement of a propulsion system 201 without a primary load path.

In the event of a mechanical failure of the actuator 230, one or more or parts thereof may be broken. For example, breaks in any of the actuating component 231, translating component 232, and/or first coupler 233 may disable the primary load path. Without the primary load path providing structural stability and support to the propulsion system 201, many movements of the propulsion system 201 which depend upon a number of variables are possible. For example, if the aircraft is in a forward flight configuration at cruising speed and the propulsion system 201 is providing forward thrust, the propulsion system 201 may exert a large force to drive the aircraft forward. The actuator 230 may bear this load by translating the force into the support structure 206 (and the rest of the aircraft). The actuator 230 may provide a strong stabilizing tension force between the propulsion system 201 and the support structure 206 that effectively pulls the support structure 206 (and remainder of the aircraft) forward in space along with the propulsion system 201. In the event of a failure of the actuator 230, the tension force provided by the primary load path may no longer be available. As a result, the propulsion system 201 may drive itself forward with its own generated forward thrust. With the revolute joint 260 still in place and connecting the propulsion system 201 to the support structure 206, the propulsion system 201 may thrust itself into a sudden and/or strong upward tilting motion about the revolute joint 260. This motion may be fast and/or strong enough as damage the revolute joint 260 and/or break the revolute joint 260, potentially leading to detachment of the propulsion system 201 from the aircraft. Due the potential high-speed nature of such events, it may not be possible to de-power the propulsion system 201 to stop thrust generation before movements and possible damage have already occurred.

In another example, if the actuator 230 fails when the propulsion system 201 is de-powered, the propulsion system 201 may suddenly drop from a vertical tilt configuration to a forward flight configuration. This may also potentially damage the revolute joint 260, components of the propulsion system 201, and/or components of the support structure 206. Other uncontrolled movements of the propulsion system 201 are also possible in the event of a failure of the actuator 230.

The damping unit 250 can be configured to slow down any otherwise uncontrolled movements of the propulsion system 201 in the event of a failure of the actuator 230. The damping unit 250 can be a passive mechanism is always engaged and therefore automatically and immediately responds to sudden movements of the propulsion system 201 without needing control instructions from a control system. A control system may deactivate the propulsion system 201 soon after the failure event.

The damping unit 250 may not completely stop movements of the propulsion system 201 (e.g., tilting up due to thrust, or tilting down due to gravity). However, the damping unit 250 may be configured to extract energy from movements of the propulsion system 201 so that the revolute joint 260, components of the propulsion system 201, and/or components of the support structure 206 do not experience detachment or other damage. As mentioned above, the damping unit 250 may provide a greater damping force in response to a faster tilt movement of the propulsion system 201 as this can cause a greater extension or compression of the damping unit 250. Accordingly, the damping unit 250 can provide a variable and sufficient force to resist a sudden and variable tilting force so that tilting of the propulsion system 201 occurs below a threshold speed or otherwise at an acceptable level.

Embodiments are primarily described herein with respect to a tilting propulsion system with an actuator configured to tilt the tilting propulsion system. Embodiments can also apply to any other suitable type of movable element and/or actuator used in any other suitable context. For example, embodiments can apply to other movable elements and corresponding actuators on an aircraft and/or actuators in other types of vehicles and any other suitable mechanical application. Examples of other movable elements on an aircraft that utilize an actuator, and to which embodiments can apply, include an aileron, elevator, rudder, spoiler, flap, slat, airbrake, and/or any other suitable control element or lift surface used to maneuver and control the movement, speed, and/or altitude of an aircraft. Such movable elements may similarly be driven by an actuator that actuates between an extended position and a retracted position and thereby causes a motion of the moveable element. Additionally, a damping unit can be coupled to such movable elements as a secondary load path that supports the movable element in case of failure of the actuator or other primary load path.

System For Testing Damping Unit

As discussed above, the actuator 230 may be configured to provide the primary load path between the propulsion system 201 and the support structure 206. In the event of failure of the actuator 230, the damping unit 250 may be configured to provide a backup load path through a damping force that cases tilting motion of the propulsion system 201. A further concern is the health and reliability of the damping unit 250 itself. If the damping unit 250 were to fail, there may not be any further redundancies to prevent damage to the revolute joint 260, the propulsion system 201, and/or the support structure 206.

The damping unit 250 may be a passive component that may not be controlled or actuated by a control system. Accordingly, it may be difficult to determine a condition of the damping unit 250, such as whether the damping unit 250 is intact and functioning properly, without manual inspection. Without regular inspections, the only natural way to discover whether the damping unit 250 is in working condition may be an actuator 230 failure event. If the damping unit 250 is working, the secondary load path may operate correctly. If the damping unit 250 not in working condition, the secondary load path may also fail, and damage may occur. If the damping unit 250 is not in working condition, it may have failed at an earlier time, and may have been in a failed state that is undetectable until the moment it was needed. This can be referred to as a latent failure. In aircraft applications, it may be considered an unacceptable risk to be unaware of the condition of the damping unit 250 until the moment the damping unit 250 is needed.

One way to have higher confidence in the damping unit 250 is a manual inspection of the damping unit 250 by human personnel before a flight. However, inspecting the damping unit 250 may involve removing, disassembling, and/or manually testing parts, and an aircraft may include multiple (e.g., 6 or 12) damping units, each of which may require inspection. As a result, regular manual inspections of the damping unit 250 may by costly in terms of time involved, work involved, and flight delays. Thus, it may not be practical to manually inspect damping units regularly (e.g., before each flight, 5 flights, or 10 flights), especially in the example of high throughput airport operations where many aircraft are executing flights at a high frequency.

Embodiments provide a system for testing an operating condition of the damping unit 250. In comparison with manual inspection, embodiments can test the damping unit 250 more quickly, in a shorter amount of time, in a simpler manner that does not require disassembling the damping unit 250, physically accessing the damping unit 250, or visually inspecting the damping unit 250, and/or in a built-in and automated fashion. One or more of the actuator 230, a control system 207, a load measurement device 295, and/or a power source 280 can be used to test the damping unit 250.

The control system 207, such as a flight control system, may be configured to control the aircraft. The control system 207 may be configurable to control the aircraft automatically and/or remotely (e.g., via a control signal received from a remote entity, such as a remote controller, a remote pilot or a remote-control tower). In various embodiments, the control system 207 can include one or more computers with one or more non-transitory computer readable medium storing instructions, and one or more processors configured to execute the instructions in order to perform the processing and control functions described herein. A corresponding control system 107 is also illustrated in FIGS. 1A-1B, and discussed in more detail below.

Referring back to FIGS. 2A-2D, a power source 280 can be configured to provide power to the propulsion system 201 and/or the actuator 230. The power source 280 can include one or more battery units and/or any other suitable source of power, according to embodiments. The power source 280 can represent a dedicated power source for the propulsion system 201 and/or actuator 230, or a shared power source for multiple components of the aircraft or the entire aircraft.

The load measurement device 295 can be configured to measure one or more parameters associated with the load on the actuator 230. In some embodiments, the load measurement device 295 may not directly measure the load on the actuator 230, but the load on the actuator 230 may be determinable based on one or more parameters measured by load measurement device 295. For example, to actuate and cause tilting motion, the actuator 230 may draw power from the power source 280 via a power distribution line 290. The load measurement device 295 may be configured to determine the amount and/or rate of power being drawn from the power source 280 by the actuator 230. The amount of power can then be used to calculate the load on the actuator 230.

As an example, the load measurement device 295 can take the form of a current meter. The current meter can determine an amount of electrical current being drawn from the power source 280 by measuring the electrical current in the power distribution line 290, or at any other suitable location. A measured amount of electrical current (e.g., in Amps) can be used to determine an amount of power being drawn from the power source 280 and/or an amount of force (e.g., in Newtons) being exerted by the actuator 230. For example, the control system 207 may store information about a known ratio of force exerted by the actuator 230 per electrical power drawn from the power source 280 (e.g., based on a known gear ratio and torque constant of the actuator 230).

Embodiments include other types of load measurement devices. For example, the load measurement device 295 can alternatively take the form of a load sensor, a pressure sensor, strain gauge, or other force sensor at the actuator 230, a remaining energy meter at the power source (e.g. to determine total amount of power used during a complete tilting motion), a voltage meter, etc. The load measurement device 295 can be in any suitable location and/or integrated into any suitable component. For example, embodiments allow the load measurement device 295 to be integrated into the actuator 230, the power source 280, and/or the control system 207.

As shown by the connecting communication lines in FIGS. 2A-2D, the control system 207 may be in operative communication with one or more of the power source 280, the load measurement device 295, the actuator 230, and/or any other suitable components. While these elements are illustrated as being positioned within the support structure 206, one or more of the control system 207, the power source 280, and/or the load measurement device 295 may be located elsewhere on the aircraft.

According to embodiments, the control system 207 can test the damping unit 250 by intentionally driving the actuator 230. For example, when the aircraft is at rest on a surface such as at an airport, the control system 207 can control the actuator 230 to actuate and cause the propulsion system 201 to tilt. When the damping unit 250 is operating correctly, it provides a certain amount of resistance to the titling and actuator 230, based on the speed of the tilting. Accordingly, if the actuator 230 outputs at least a certain amount of force, it can be determined that the damping unit 250 is functioning correctly and has not failed.

Method For Testing Damping Unit

A method 300 for testing the condition of a damping unit can be described with respect to FIG. 3.

At step 1, an actuator can be controlled to actuate. For the example a control system or a human operator can control the actuator to actuate. Actuation of the actuator can cause motion of a movable element coupled to the actuator. For example, actuation of the actuator can cause the propulsion system to undergo tilting motion. The tilting motion can include an upward tilting motion (e.g., toward vertical flight configuration) and/or a downward tilting motion (e.g., toward forward flight configuration).

The actuator can be controlled to actuate for any suitable amount of time and/or distance. For example, the actuator can be controlled to actuate through a full travel range so that the propulsion system tilts from a forward flight configuration to a vertical flight configuration, or from a vertical flight configuration to a forward flight configuration. Alternatively, in some embodiments, actuator can be controlled to actuate a portion of a full travel range that is less than a full travel range, such as one half of the full travel range from forward flight configuration to a vertical flight configuration. In some embodiments, the actuator can be controlled actuate in multiple directions and/or through more than one full travel range. For example, the actuator can be controlled actuate so that the propulsion system tilts from a starting position of a vertical flight configuration to a forward flight configuration, and then from the forward flight configuration back to the vertical flight configuration.

The actuator can be caused to actuate at any suitable speed so that the propulsion system tilts at any suitable corresponding speed. For example, the actuator may be controlled to actuate at a speed that is sufficient for causing a responsive force from the damping unit that is measurable, detectable, or otherwise suitable for testing the damping unit. In some embodiments, the actuator can be controlled to actuate at a maximum speed. The actuation speed used during testing may be greater than an actuation speed (and corresponding tilting speed) used during flight operations. In some embodiments, the speed of actuation and tilting can vary throughout the testing process due to time for acceleration and/or deceleration. Additionally, the speed of actuation and tilting can be greatest at a certain tilt range of the propulsion system that may cause the greatest movement of the damping unit (e.g., tilt angles near vertical flight configuration).

According to embodiments, the aircraft can be at rest during step 1 and/or other steps of the method 300. When the aircraft is at rest, the propulsion system and actuator may experience known and relatively static conditions. For example, external forces such as wind force may be small enough as to be negligible or can be accounted for accurately when the aircraft is at rest. In contrast, during flight there may be significant added forces on the propulsion system and/or actuator, such as forces caused by thrust generated by the actuator and/or air resistance due to aircraft movement.

At step 2, a load on the actuator can be determined. For example, the load measurement device can measure a parameter while the actuator is actuating and/or the movable element is in motion (e.g., the propulsion system is tilting). For example, if the load measurement device is configured to measure electric current drawn by the actuator from the power source, the parameter can be the amount of electric current. The load measurement device may measure a parameter as a function of time. For example, the amount of electric current drawing throughout the actuation and tilting, as the amount of electric current may vary over time.

According to embodiments, the load measurement device can provide the measured parameter to the control system, and the control system can calculate or otherwise determine the load on the actuator based on the measured parameter. The control system can determine the load as a function of time (e.g., a rate of force being applied by the actuator), based on the parameter as a function of time. For example, the amount of electric current drawn by the actuator can indicate the amount of power being used by the actuator to bear the load on the actuator (e.g., provide a sufficient rate of force to cause the tilting motion). The control system may store any suitable information about power consumption at the actuator to calculate a load based on a measured electric current. In some embodiments, the load measurement device can determine the load using its own integrated processors, and then can provide the determined load to the control system.

At step 3, the load on the actuator can be compared to a predetermined threshold value. In some embodiments, a maximum value can be identified from the load as a function of time. The maximum value of the determined load can be compared to the predetermined threshold value to determine whether the maximum value of the determined load exceeds the predetermined threshold value.

Embodiments allow any suitable predetermined threshold value to be utilized during step 3. For example, a calibration process may be performed at an earlier time, before the method 300. During the calibration process, the damping unit may be removed, disconnected, or otherwise disengaged. With the damping unit disconnected, the actuator can be actuated in a manner similar to or the same as step 1 (e.g., to provide the same or similar tilting speed), and the load can be measured in a manner similar to or the same as step 2. As a result, the control system can determine a maximum load value or a load as a function of time when the damping unit is disconnected. According to embodiments, the predetermined threshold value can be determined based on this calibration process. For example, the predetermined threshold value can be set to be or set based on the maximum load value from the calibration process, or an average rate of force over time during the calibration process.

In some embodiments, the predetermined threshold value can be the maximum load value or an average power value from the calibration process plus a buffer amount (e.g., 10%, 20%, or 30% of the maximum load). An added buffer can account for variable wind loads or other variability in testing conditions, can account for potential inaccuracies in measurement, can ensure that at least a certain amount of damping force is being applied, and/or otherwise improve confidence in step 3 that the load on the actuator is being sufficiently increased (e.g., by a predefined minimum amount) by the damping unit for a given speed of tilting motion.

In this manner, a predetermined threshold value can be based on a previous load on the actuator during a previous motion of the movable element when the damping unit was disengaged. Further, in some embodiments, the predetermined threshold can be determined based on multiple calibration processes performed at different times and/or in different conditions (e.g., wind speeds). The predetermined threshold can be based on an average of the calibration processes, or based on a maximum load result from among the calibration processes.

In other embodiments, the damping unit may be connected during the calibration process. At that time, the damping unit can be confirmed to be functional through manual inspection or any other suitable means. As a result, maximum load value determined during the calibration process can be a maximum load value produced when the damping unit is known to be functioning. In this case, the predetermined threshold value can be set to be the maximum load value from the calibration process. Alternatively, the predetermined threshold value can be the maximum load value from the calibration process plus or minus a buffer amount (e.g., 1%, 5%, or 10% of the maximum load). A subtracted buffer can provide room for variation across different damping units and/or different testing conditions.

At step 4, the damping unit can be determined to be operational (e.g., functioning correctly and/or providing a sufficient damping force or at least a minimum damping force for a certain speed of tilting motion) if the load on the actuator is greater than the predetermined threshold value. For example, the control system and/or human operator can conclude that the damping unit is in working condition if the load on the actuator is greater than the predetermined threshold value, or substantially equal to the predetermined threshold value. As mentioned above, the predetermined threshold value can include a buffer amount and/or otherwise be set to indicate with confidence that the damping unit is functioning correctly even with some amount of possible variation in loads due to variations in testing conditions, measurement accuracy, actuator performance, and/or damping unit performance.

According to embodiments, if it is determined that the damping unit has failed or otherwise is not functioning correctly, the control system may produce a warning indicator. In response, a human operator may proceed to manually inspect, repair, and/or replace the damping unit before the next flight.

At step 5, the control system and/or human operator can initiate a flight process in response to determining that the damping unit is operational and/or completing any other suitable pre-flight tests and checks. In some embodiments, the aircraft can be marked as ready for flight (e.g., the control system can update a database to indicate the aircraft is ready) after the damping unit and/or any other suitable components have been checked.

According to embodiments, each of the steps of method 300 can be automated and performed by the control system. Additionally, the process can be completed in a matter of seconds (e.g., the time to complete the tilting process in step 1), as the calculations in steps 2-4 can be performed instantly by the control system. Thus, embodiments provide a method for testing an operating condition of a damping unit that is efficient and simple in comparison with manual inspection, that requires little to no human involvement, that can be built-in to the aircraft (e.g., the control system can execute the method), and that does not require additional separate sensors (e.g., a current meter may already be included on the aircraft for other purposes such as actuator control), instrumentation, or weight. Such improvements in efficiency enable regular testing of the damping unit (e.g., before each flight) with little cost in terms of time and effort. Regular testing can improve confidence in the damping unit, reduce the chances of missing a latent failure, and/or improve flight safety.

In some embodiments, step 1 and/or other steps of the method 300 can take place during flight. In such an embodiment, the method 300 may be performed during a stage of flight for which typical forces on the propulsion system and/or actuator have been previously measured and are known to be within a certain range. For example, an expected, typical, or maximum load on the actuator as caused by known combination of thrust magnitude, aircraft speed, tilt position, rotor blade pitch, altitude, temperature, and/or wind speed may be known or approximated (e.g., based on one or more previous calibration processes performed during flight). In some embodiments, the damping unit can be tested according to the method 300 each time a propulsion system is tilted during a flight.

Referring back to step 3, embodiments allow alternative manners of comparing a measured load to a threshold value. For example, instead of comparing maximum loads, the control system may instead compare the shape of loads over time. The damping unit may produce an increasing damping force, and thereby increase the load on the actuator, as a function of tilting speed. In contrast, during a calibration process without a damping unit, the actuator may be controlled to provide a substantially constant force to the propulsion system throughout the tilting process, regardless of tilting speed. Accordingly, the damping unit can influence the shape of a plot of load vs. time. For example, to confirm that the damping unit is functioning properly, the control system can determine whether the actuator load increases by a predetermined threshold amount (e.g., 2%, 5%, 10%, 20%) during maximum tilting speed as compared to slower tilting speeds (e.g., during the beginning or end of the tilting process).

Embodiments herein are described primary with respect to testing the condition of a damping unit coupled to a tilting propulsion system. Embodiments can also apply to any other suitable actuator and/or movable element disposed on an aircraft or otherwise. For example, a damping unit can be coupled to any other suitable flight control element used to maneuver and control the movement, speed, and/or altitude of an aircraft, such as an aileron, elevator, rudder, spoiler, flap, slat, airbrake, and/or any other suitable element or lift surface. Such elements may similarly be driven by an actuator that actuates between an extended position and a retracted position. The method described above for testing a damping unit coupled to a titling propulsion system can be similarly performed for a damping unit coupled to any other suitable type of movable element.

Control System

Referring back to FIGS. 1A-1B, as mentioned above, the aircraft 100 may include a control system 107, such as a flight control system, which is configured to control the aircraft 100. The control system 107 may be configurable to control the aircraft 100 automatically and/or remotely (e.g., via a control signal received from a remote entity, such as a remote controller, a remote pilot or a remote-control tower). In various embodiments, the control system 107 can include one or more computers with one or more non-transitory computer readable medium storing instructions, and one or more processors configured to execute the instructions in order to perform the processing and control functions described herein.

For example, the control system 107 may control when the propulsion systems 101(A)-(L) should be operated, and/or the amount of power provided to the propulsion systems 101(A)-(L). The control system 107 may be configurable to control the propulsion systems 101(A)-(L) independently from one another. According to various embodiments, the control system 107 may control the propulsion systems 101(A)-(L) based on input received from a remote controller (e.g. remote pilot), input received from an autopilot, sensor data and/or flight data received from the sensors (e.g. sensors measuring air temperature, electric motor temperature, airspeed of the aircraft, etc.), computers, and other input/output devices coupled to the aircraft.

The control system 107 may also control one or more tilting mechanisms to switch the positioning of one or more tilting fans from the forward flight configuration to the vertical flight configuration, from the vertical flight configuration to the forward flight configuration, to one or more intermediary tilt angles, and/or to sweep through a range of tilt angles according to a flight plan or as needed. For example, the control system 107 be in communication with and in control of one or more actuators (e.g., the actuator 230 illustrated in FIG. 2) configured to cause tilting for one or more propulsion systems 101(A)-(L). As a result, the control system can control the tilt configuration of a propulsion system through a corresponding actuator. According to various embodiments, the control system (e.g., flight control system) may control the angles of the tilting fans based on sensor data and/or flight data received from the sensors (e.g., sensor measuring air temperature, electric motor temperature, airspeed of the aircraft, etc.), computers, and other input/output devices coupled to the aircraft.

The control system 107 may further control one or more pitching mechanisms to switch the positioning of one or more rotor blades between two or more pitch positions. According to various embodiments, the control system 107 may control the rotor blade pitch positions based on sensor data and/or flight data received from the sensors (e.g., sensor measuring air temperature, electric motor temperature, airspeed of the aircraft, etc.), computers, and other input/output devices coupled to the aircraft. The pitch of a rotor blade may be set based upon current flight stage and/or flight needs. For example, a first pitch, which may be a low pitch, may be chosen during times when the aircraft is accelerating (e.g., forward, or upward), hovering, taking off, and/or landing. A second pitch, which may be a high pitch, may be selected when the aircraft has reached cruise flight (e.g., having reached a predefined forward velocity).

Accordingly, the control system 107 may be configured to translate pilot or other operator input, and/or corrections computed by an onboard computer, into forces and moments and/or to further translate such forces and moments into a set of actuator (e.g., vertical lift rotors; propellers; control surfaces, such as ailerons; etc.) and/or associated parameters (e.g., lift fan power, tilt angle, rotor blade pitch, speed, or torque) to provide the required forces and moments. For example, pilot or other operator inputs may indicate a desired change in the aircraft's speed, direction, and/or orientation, and/or wind or other forces may act on the aircraft, requiring the propulsion systems and/or other actuators to be used to maintain a desired aircraft altitude (roll/pitch/yaw), speed, and/or altitude.

According to various embodiments, the control system 107 may be configurable to receive a flight instruction, such as a takeoff, hover, cruise, or landing instruction. The control system 107 may then determine the current location and/or velocity of the aircraft 100, and then control the operation of the propulsion systems 101(A)-(L) based on the flight instruction. During the operation of the aircraft 100, the control system 107 may be configurable to continuously monitor the operational states of the propulsion systems 101(A)-(L) in view of the flight instruction.

The aircraft 100 can further include landing gear 130. The landing gear 130 can include any suitable combination of one or more skids, wheels, skis, pontoons, shock absorbers, struts, and/or any other suitable component for supporting the aircraft 100 when landing and/or landed on the ground. In some embodiments, the landing gear 130 can be retractable into a compartment within the fuselage 104.

The aircraft 100 can include any other suitable control structures and control surfaces. Any suitable number of ailerons, rudders, elevators, slats, flaps, spoilers, and/or stabilizers can be included. For example, a horizontal stabilizer 140 (e.g., a tailplane) can be coupled to a rear end or tail of the fuselage 104. The horizontal stabilizer 140 may be in any suitable shape or form. For example, as shown in FIGS. 1A-1B, the horizontal stabilizer 140 may include two stabilizer surfaces protruding at horizontally from a tail. In some embodiments, each of the stabilizer surfaces can further include hinged control surfaces on the aft edges. Additionally, as shown in FIGS. 1A-1B, an additional (e.g., third) vertical stabilizer surface can be mounted on the tail, extending vertically upward and/or downward. Introducing the horizontal stabilizer 140 can provide additional stability and control of the aircraft 100. This can be especially useful during times when the vertical fans are disabled or otherwise not being utilized or relied on for control and stability (e.g., during cruising flight).

Flight Process

According to various embodiments, a control system may control flight of an aircraft configured for vertical takeoff and landing.

An aircraft may be in a stationary position on the ground. For example, the aircraft may be parked at a charging station for charging the batteries. Alternatively, the aircraft may be parked at a location awaiting to receive cargo or passengers.

Before beginning a flight process, a flight control system of the aircraft may perform one or more pre-flight tests and checks, and/or an operator may perform one or more tests and checks on the aircraft. For example, a condition of a damping unit may be tested, as discussed above with respect to FIG. 3. If the damping unit is determined to be in a working condition, and/or any other suitable tests are completed and passed, the aircraft may be marked as ready for flight.

The flight control system of the aircraft may receive a flight plan (e.g., from the autopilot, a pilot or a remote controller pilot) to arrive at a predetermined destination. The flight plan may include an instruction to takeoff from the ground. The flight control system may control one or more of the propulsion systems to activate. For example, the thrust-producing components of the aircraft may be deactivated or in a standby mode. The flight control system may power up the propulsion systems from a deactivated mode so that they are ready to generate vertical lift.

The control system may operate a first set of one or more propulsion systems coupled to the aircraft. Each of the first set of one or more propulsion systems may have two or more rotor blades and a fixed vertical orientation or a tiltable orientation currently set to a vertical flight configuration.

For example, the flight control system may initiate a takeoff sequence to lift the aircraft off of the ground. The flight control system may operate the first set of one or more propulsion systems to provide vertical thrust so that the aircraft leaves the ground. The flight control system may continue operating the first set of one or more propulsion systems in this manner until a certain time has passed or a certain height is reached (e.g., a safe distance from a landing pad). The control system can continue to operate the first set of one or more propulsion systems during liftoff, hovering, landing, or any other suitable stage of flight to provide vertical thrust.

The control system may at some points control one or more of the first set of one or more propulsion systems, such as fixed vertical fans, to stop operating during other stages of flight, such as forward cruising flight when vertical lift may additionally and/or instead be provided by wings of the aircraft. For example, after a certain amount of time has passed and/or altitude gained, the flight control system may receive an instruction to transition to forward flight. Before switching to the forward flight mode, the control system may check one or more of the altitude, speed and orientation of the aircraft to ensure that the parameters are within a predetermined, desirable range. In some embodiments, the control system may communicate the parameters to a remote entity (e.g., a remote-control tower or a remote pilot).

The control system may operate a second set of one or more propulsion systems. Each of the second set of one or more propulsion systems have a fixed horizontal orientation or a tiltable orientation set to a forward flight configuration. Each of the second set of one or more propulsion systems may have two or more rotor blades. In some embodiments, one or more propulsion systems, such as tilting fans, may be included in both the first set of one or more propulsion systems and the second set of one or more propulsion systems.

For example, upon receiving the flight instruction to transition to forward flight, the control system may operate a second set of one or more propulsion systems to generate forward thrust for the aircraft. The flight control system can control the forward acceleration in any suitable manner, such as by may gradually increasing the power supplied to the second set of one or more propulsion systems so that the aircraft gradually gains forward velocity.

In some embodiments, the second set of one or more propulsion systems may activate and begin providing forward thrust while the aircraft is still in the process of gaining altitude from the vertical lift fans. As a result, forward travel can overlap with vertical lifting. Additionally, the flight control system can adjust power to the first set of one or more propulsion systems as required to maintain stability and altitude while the second set of one or more propulsion systems causes forward airspeed to increase.

In some embodiments, one or more of the first set of propulsion systems and/or the second set of one or more propulsion systems may be operated to tilt between a forward flight configuration and a vertical flight configuration. Such tilting propulsion systems may be operated during both one or more steps to provide vertical thrust and one or more steps to provide horizontal thrust.

In some embodiments, one or more tilting propulsion systems may be operated to gradually, iteratively, and/or continuously tilt from a vertical flight configuration to a forward flight configuration. When the tilting propulsion systems are set to one or more intermediary tilt angles, the thrust can be provided at an angle with a partial vertical component and a partial horizontal component. As the tilting propulsion systems tilt through one or more intermediary tilt angles, the horizontal thrust component increases and the vertical thrust component decreases. In some embodiments, the one or more tilting propulsion systems may be operated to pause movement and tilting at a predefined intermediary tilt angle (referred to as a third tilt angle, a critical tilt angle, or a threshold tilt angle) that may be near-horizontal but above horizontal, while continuing to operating the propulsion systems to provide thrust. Once a predefined speed and/or altitude are obtained, the one or more tilting propulsion systems may be operated to resume tilting progress until reaching the forward flight configuration. In some embodiments, a tilting propulsion system may be operated to tilt at or below a predefined speed that causes less than a predefined resistance from a damping unit coupled to the tilting propulsion system.

The control system may set and/or modify a pitch position setting of one or more rotor blades of one or more propulsion systems (e.g., from the first set and/or the second set). In some embodiments, one or more rotor blades may be initially set to a first pitch position. The first pitch position can be maintained during one or more stages of flight, such as takeoff and/or forward acceleration. The control system may later adjust the one or more rotor blades to have a second pitch position. For example, once cruising flight is reached (e.g., after reaching a certain forward speed), the pitch setting can be changed to the second pitch position. In some embodiments, the pitch setting can be gradually and/or iteratively changed from the first pitch position to the second pitch position as forward velocity increases, and can be gradually changed from the second position to the first pitch position as forward velocity decreases.

The control system can continue to operate the second set of one or more propulsion systems during forward cruising flight, forward acceleration, deceleration, or any other suitable stage of flight to provide horizontal thrust. The control system may at some points control the first set of one or more propulsion systems to stop operating during other stages of flight, such as liftoff, hovering, and/or landing. At some points in time, the control system can operate both the first set of one or more propulsion systems and the second set of one or more propulsion systems simultaneously.

Subsequently, the flight control system may deactivate one or more of the first set of one or more propulsion systems, or otherwise reduce power provided to the first set of one or more propulsion systems. For example, once the second set of one or more propulsion systems have generated a predetermined velocity so that the wings provide enough lift to maintain altitude, the first set of one or more propulsion systems may no longer be needed for vertical lift. Accordingly, one or more of the first set of one or more propulsion systems can be powered down, deactivated, placed in a standby mode, or be operated at a reduced power level during forward flight of the aircraft.

The control system may continue alternating between operating one or more of the first set of one or more propulsion systems and/or the second set of one or more propulsion systems, continue tilting one or more tilting propulsion systems, and/or continue adjusting the pitch position of one or more rotor blades (e.g., through adjusting a coupled tilt angle of a propulsion system).

In the possible event of a failure of a titling mechanism of a propulsion system during flight, a coupled damping unit can be preconfigured to slow any uncontrolled tilting movements to prevent damage.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   controlling, by a control system, an actuator to actuate to cause a tilting motion of a tiltable propulsion system relative to a support structure, wherein the actuator is coupled to the tiltable propulsion system and coupled to the support structure, a damping unit is coupled to the tiltable propulsion system and coupled to the support structure, and the damping unit is configured to provide a damping force that opposes the tilting motion of the tiltable propulsion system;
   determining, by the control system, a load on the actuator during the tilting motion of the tiltable propulsion system, wherein the damping unit, when operational, causes an increase in the load on the actuator by opposing the tilting motion of the tiltable propulsion system being caused by the actuator;

comparing, by the control system, the load on the actuator to a predetermined threshold value; and
determining, by the control system, that the damping unit is operational when the load on the actuator exceeds the predetermined threshold value, wherein exceeding the predetermined threshold value indicates the load on the actuator has been increased as a result of the damping unit applying the damping force to the tiltable propulsion system.

2. The method of claim 1, wherein the determining the load on the actuator during the tilting motion of the tiltable propulsion system includes:
   receiving, from a load measurement device, a measured parameter; and
   calculating, based on the measured parameter, the load on the actuator.

3. The method of claim 2, wherein the load measurement device is a current meter, and the measured parameter is an amount of electric current being drawn by the actuator.

4. The method of claim 1, wherein a magnitude of the damping force is based on a speed of the tilting motion of the tiltable propulsion system, where an increase in speed causes a corresponding increase in magnitude.

5. The method of claim 1, wherein the predetermined threshold value is based on a previous load on the actuator during a previous motion of the tiltable propulsion system when the damping unit was disengaged.

6. The method of claim 1, wherein the actuator actuates linearly between an extended position and a retracted position, the damping unit is configured to passively extend or retract linearly, the damping unit is configured to resist an extension or a retraction, and the tilting motion of the tiltable propulsion system causes the extension or the retraction of the damping unit.

7. The method of claim 1, wherein the actuator provides a primary load path between the tiltable propulsion system and the support structure, the damping unit provides a secondary load path between the tiltable propulsion system and the support structure, the secondary load path opposes the primary load path, and the determining that the damping unit is operational includes determining that the secondary load path is functioning.

8. The method of claim 7, wherein the tilting motion of the tiltable propulsion system is a first tilting motion of the tiltable propulsion system, and wherein, upon a failure of the primary load path, the secondary load path slows a second tilting motion of the tiltable propulsion system.

9. The method of claim 1, wherein the tiltable propulsion system is coupled to an aircraft, and the controlling the actuator to actuate is performed while the aircraft is at rest on a surface, and further comprising:
   after the determining that the damping unit is operational, initiating a flight process.

10. The method of claim 1, wherein the actuator is coupled to the support structure and the tiltable propulsion system such that actuating of the actuator between an extended position and a retracted position causes the tilting motion of the tiltable propulsion system between a first position and a second position, and the damping unit is coupled to the support structure and the tiltable propulsion system such that the tilting motion of the tiltable propulsion system causes extension or retraction of the damping unit.

11. The method of claim 10, wherein the tiltable propulsion system is coupled to an aircraft, and the support structure is coupled to the aircraft.

12. The method of claim 11, wherein the first position is a vertical flight configuration, and the second position is a forward flight configuration.

13. A control system comprising:

a processor;

a computer readable medium comprising instructions that, when executed by the processor, cause the processor to execute a method comprising:

controlling an actuator to actuate to cause a tilting motion of a tiltable propulsion system relative to a support structure, wherein the actuator is coupled to the tiltable propulsion system and coupled to the support structure, a damping unit is coupled to the tiltable propulsion system and coupled to the support structure, and the damping unit is configured to provide a damping force that opposes the tilting motion of the tiltable propulsion system;

determining a load on the actuator during the tilting motion of the tiltable propulsion system, wherein the damping unit, when operational, causes an increase in the load on the actuator by opposing the tilting motion of the tiltable propulsion system being caused by the actuator;

comparing the load on the actuator to a predetermined threshold value; and determining that the damping unit is operational when the load on the actuator exceeds the predetermined threshold value, wherein exceeding the predetermined threshold value indicates the load on the actuator has been increased as a result of the damping unit applying the damping force to the tiltable propulsion system.

14. The control system of claim 13, wherein the determining the load on the actuator during the tilting motion of the tiltable propulsion system includes:

receiving, from a load measurement device, a measured parameter; and calculating, based on the measured parameter, the load on the actuator.

15. The control system of claim 13, wherein the predetermined threshold value is based on a previous load on the actuator during a previous motion of the tiltable propulsion system when the damping unit was disengaged.

16. The control system of claim 13, wherein the tiltable propulsion system is coupled to an aircraft.

17. An aircraft comprising:

a tiltable propulsion system;

a support structure;

an actuator coupled to the tiltable propulsion system and coupled to the support structure, and configured to cause a tilting motion of the tiltable propulsion system relative to the support structure;

a damping unit coupled to the tiltable propulsion system and coupled to the support structure, and configured to provide a damping force to the tiltable propulsion system that opposes the tilting motion of the tiltable propulsion system; and a control system configured to:

control the actuator to actuate to cause the tilting motion of the tiltable propulsion system;

determine a load on the actuator during the tilting motion of the tiltable propulsion system, wherein the damping unit, when operational, causes an increase in the load on the actuator by opposing the tilting motion of the tiltable propulsion system;

compare the load on the actuator to a predetermined threshold value; and determine that the damping unit is operational when the load on the actuator exceeds the predetermined threshold value, wherein exceeding the predetermined threshold value indicates the load on the actuator has been increased as a result of the damping unit applying the damping force to the tiltable propulsion system.

18. The aircraft of claim 17, further comprising:

a fuselage; and a pair of wings coupled to opposite sides the fuselage, wherein the support structure is coupled to one of the pair of wings.

19. The aircraft of claim 17, wherein the tilting motion of the tiltable propulsion system is a first tilting motion of the tiltable propulsion system, and wherein, upon a failure of the actuator, the damping unit slows a second tilting motion of the tiltable propulsion system.

* * * * *